2,757,204
Patented July 31, 1956

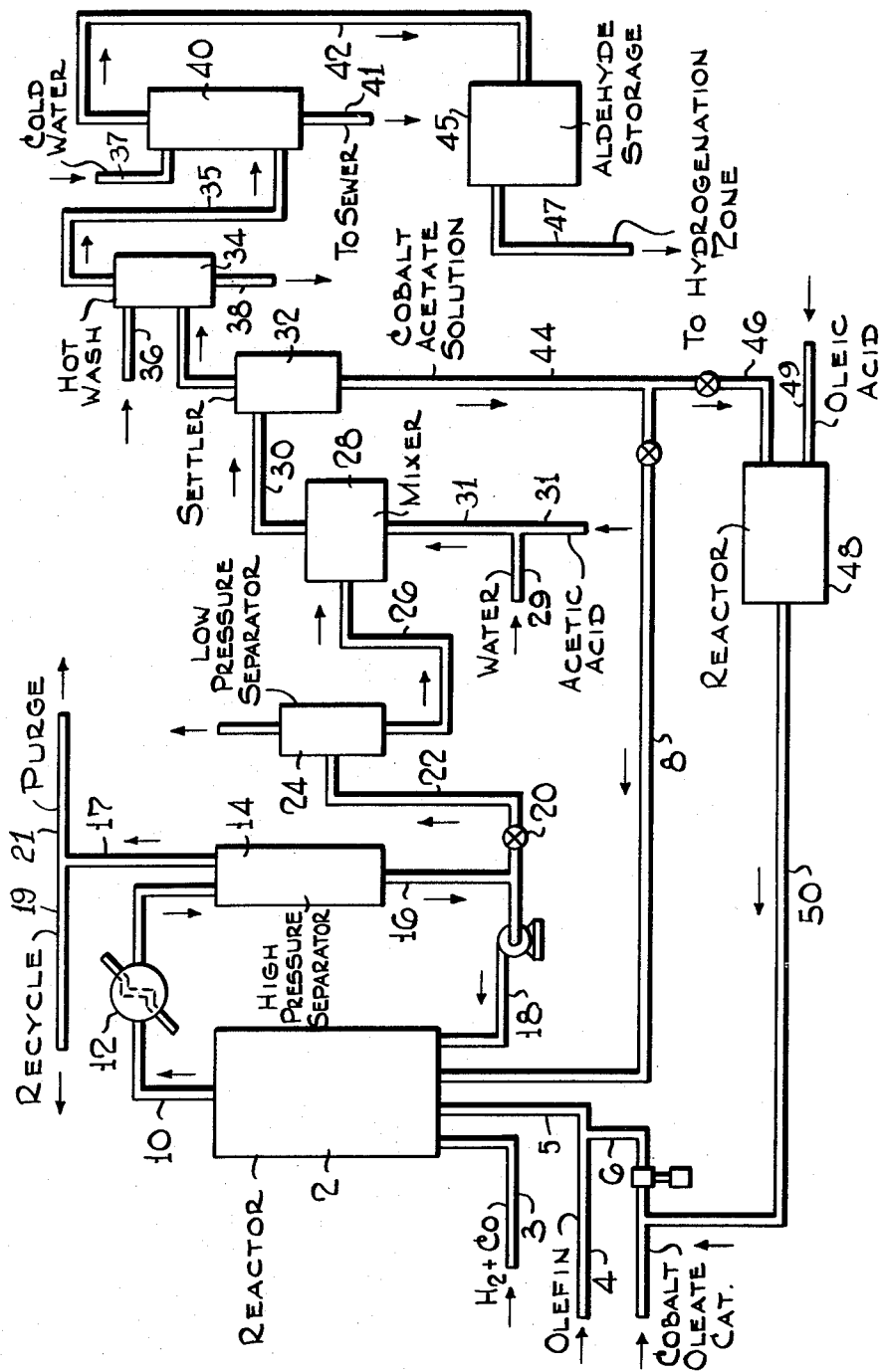

2,757,204
ACID DECOBALTING OF OXO PRODUCTS

Walter F. Ratcliff, Aruba, Netherlands West Indies, assignor to Esso Research and Engineering Company, a corporation of Delaware Application April 27, 1951, Serial No. 223,251

8 Claims. (Cl. 260—604)

The present invention relates to the preparation of organic compounds by the reaction of carbon monoxide and hydrogen with carbon compounds containing olefinic linkages in the presence of a carbonylation catalyst. More specifically, the present invention relates to the recovery of the cobalt catalyst utilized in the foregoing reaction from the product of the first stage of the cobalt carbonylation reaction for further use in the process.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch chained olefins and di-olefins such as propylene, butylene, pentene, hexene, heptene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalyst in the first stage of the prior art processes is usually added in the form of salts of the catlytically active metal with high molecular weight fatty acids, such as stearic, oleic, palmitic, naphthenic, etc., acids. Thus, suitable catalysts are, for example, cobalt oleate or naphthenate, or iron linoleate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g. and at temperatures in the range of about 150–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture and it is to this stage that the present principal invention applies.

From the catlyst removal zone the reaction products, comprising essentially aldehydes, may be transferred to a hydrogenation zone, and the products reduced to the corresponding alcohols in a manner known per se.

One of the problems involved in the aldehyde synthesis reaction is the fact that the catalyst metal, such as cobalt, though added as an organic salt, reacts with carbon monoxide under the synthesis conditions to form the metal carbonyl. There is basis for the belief that the metal carbonyl itself is the active form of the catalyst. This dissolved catalyst must be removed prior to the subsequent hydrogenation, as otherwise it would separate out on the hydrogenation catalyst, plug transfer lines and heat exchangers, etc. The carbonyl remains dissolved in the reaction product from the primary carbonylation stage and is therefore removed in the catalyst removal, or decobalting zone. A good way to remove the cobalt is by a thermal method wherein the accrued product in the first stage is heated to a temperature of from about 300°–350° F. Conveniently, a steam coil immersed in the liquid to be decobalted is employed. A pressure of from about 100–175 p. s. i. g. is maintained in the decobalting zone by the injection of a gasiform material such as hydrogen, an inert vapor, etc. It is desirable to employ a gasiform material in order that the CO partial pressure be maintained at a relatively low value in the decobalting zone. Periodically it is necessary to take the decobalter off stream to remove accumulated metallic cobalt to prevent plugging of feed lines and adjacent areas of the decobalting vessel. Furthermore, cobalt metal deposits as a film on the heating means and requires constant removal to prevent plugging of the preheating equipment and surfaces. The removal of these films and deposited cobalt metal is a tedious and difficult process and adds a significant cost to the economics of the carbonylation reaction. Furthermore, thermal decobalting usually did not completely remove soluble cobalt from the aldehyde product.

It is one of the purposes of the present invention to provide an improved and novel means for removing dissolved carbonylation catalyst from conversion products resulting from the reaction of olefinic compounds with carbon monoxide and hydrogen.

It is also a purpose of the present invention to describe an efficient and effective means for recovering and reutilizing carbonylation catalyst.

Other and further objects and advantages of the invention will become apparent from the more detailed description hereinafter.

It has now been found that when the reactor effluent from the carbonylation zone is treated with dilute aqueous solutions of organic acids whose cobalt salts are water soluble and oil insoluble, exceptionally efficient decobalting is obtained, with residual cobalt content of the aldehyde product less than 10 parts per million. The thermal decobalting process frequently left a feed for the subsequent hydrogenation process containing from 100–500 parts per million of dissolved cobalt material. This resulted from the fact that though cobalt carbonyl is readily decomposed at the thermal conditions, other compounds of cobalt, such as cobalt salts, are quite stable at these temperatures. Cobalt salts originate from the formation of secondary reaction products, such as formic and higher fatty acids in the course of the reaction, and from the fatty acid cobalt soaps originally added as catalyst.

In accordance with the invention, therefore, the aldehyde synthesis product containing about 1800–2000 parts per million or more of cobalt, is treated with dilute aqueous organic acid at temperatures substantially below those required for thermal decobalting, in the range of about 150 to 200° F. In view of the heat-sensitive nature of the aldehyde, substantial secondary reaction product formation is thus avoided.

An important advantage of the present invention is that in accordance therewith, cobalt recovery is considerably simplified and made more feasible. Because of the importance of this metal, it is essential for an economically feasible process that substantially all the metal be recovered and re-utilized. This is readily done in accordance with the present invention. Thus, instead of precipitating the metal as a solid as in prior art processes, the effect of dilute aqueous organic acid injection is to convert substantially all the cobalt, regardless in what form it is present in the aldehyde product, into the corresponding water soluble salt. In one embodiment of the invention, this water soluble salt may be recycled directly to the aldehyde synthesis zone to provide both catalyst and cooling for said zone. In another embodiment, the salt may be neutralized to form the hydroxide, suspending the same in an organic liquid, like aldehyde product or olefin, and recycling this to the reaction zone. This is carried out when it is desired to avoid excessive addition of water to the carbonylation zone. If desired, the recovered water soluble cobalt salt may be heated with a higher molecular weight organic acid to form an oil soluble cobalt salt.

The present invention will best be understood from the more detailed description hereinafter, wherein reference will be made to the accompanying drawing, which is a schematic representation of a system suitable for carrying out a preferred embodiment of the invention.

Turning now to the figure, olefin feed is passed, after preheating in a fired coil (not shown) through feed lines 4 and 5 to the bottom portion of primary reactor 2. The latter comprises a reaction vessel which may, if desired, be packed with non-catalytic material, such as Raschig rings, pumice, and the like, and may be divided into discrete packed zones.

Catalyst may be injected into the olefin feed in one modification of the invention, as an oil-soluble cobalt soap, such as cobalt oleate or naphthenate or the like, through line 6, in amounts equivalent to about 0.1–0.5% of cobalt on olefin. This cobalt oleate may be produced from the water soluble cobalt salt resulting from the decobalting operation. In another modification of the invention, an aqueous solution of an organic cobalt salt is introduced through line 8 into reactor 2.

Simultaneously, a gas mixture comprising preferably approximately equal volumes of $H_2$ and $CO$ is supplied through line 3 to primary reactor 2 and flows concurrently with the olefin feed. Reactor 2 is preferably operated at a pressure of about 2500–3500 p. s. i. g. and at a temperature of about 200°–450° F., depending upon the olefin feed and other reaction conditions.

Liquid oxygenated reaction product containing catalyst in solution and unreacted synthesis gas, are withdrawn overhead from an upper portion of reactor 2, and transferred through line 10 and cooler 12 to high pressure separator 14, where unreacted gases are withdrawn overhead through line 17 and preferably at least in part recycled.

A stream of primary reaction product containing dissolved therein relatively high concentration of cobalt carbonyl and other forms of cobalt is withdrawn from separator 14 through line 16. A portion of this stream may be recycled, if desired, to reactor 2 via line 18 to aid in cooling and maintenance of temperature control of the primary carbonylation stage. The balance of the primary reaction product may be withdrawn through pressure release valve 20 and transferred through line 22 to low pressure separator 24, wherein de-gassing is substantially completed. The latter vessel may be at a pressure of about 25 to 200 p. s. i. g.

De-gassed aldehyde product is passed from the lower portion of 24 through line 26 to mixer 28. This unit is of any conventional design, and is adapted to mix thoroughly an aqueous and a water-insoluble liquid organic phase. Water is injected through line 29 and an organic acid whose cobalt salts are water soluble is added through line 31. Suitable acids are acetic, formic, oxalic, and the like. Acetic acid is preferred, for its cobalt salts have greater water solubility, thus requiring less water for their complete recovery. Acid is added in amounts sufficient at least to combine with all the cobalt present, and water is added in amounts at least sufficient to dissolve all the cobalt salt formed. Thus, a satisfactory operation may be had employing about 10% (based on aldehyde) of a 5% aqueous solution of acetic acid. For less water soluble cobalt salts, a greater amount of water is required.

The temperature level within mixer 28 must be carefully controlled. Higher temperatures speed the reaction rate, but too high temperatures result in thermal decomposition of cobalt carbonyl to metallic cobalt, which is difficultly soluble in the dilute acid mixture, and this is undesirable. The temperature within mixing zone 28 is preferably maintained at about 150° to 185° F. and should not exceed 200° F.

After a sufficient mixing period, on the order of 30 to 120 minutes, more or less, the mixture is passed through line 30 to settler 32, where the aqueous and aldehyde layers are allowed to stratify. The upper aldehyde layer may then be passed to water washing equipment 34, where hot water, say at about 165° F., may be injected through line 36 to wash out the last traces of cobalt acetate. About 10% of water in the aldehyde product may be used for this purpose and the wash water, withdrawn through line 38, may be advantageously employed as the diluent for the organic acid used as the decobalting medium. The aldehyde product may then be withdrawn through line 35 and be given a second water wash in 40 with an excess of cold water, say about 200%, to remove any traces of organic acid.

Overhead from washing equipment 40 there is withdrawn through line 42, the substantially completely decobalted aldehyde product, which may be passed to storage for subsequent conversion into alcohols in a manner known per se.

Returning now to settler 32, the lower aqueous layer containing in solution the recovered cobalt salt is withdrawn through line 44. When it is desired to return the cobalt as an oil-soluble salt, rather than as the water-soluble salt, the aqueous stream may be passed through line 46 to reactor 48, wherein a high molecular weight organic acid such as oleic acid, may be added. The recovered salt may be heated with the oleic acid until the acetic acid is driven off overhead and the oil-soluble salt formed, which is then recycled to the reactor 2 via lines 50, 6 and 4, preferably dissolved in olefin feed.

Another method of recovering the cobalt as a fatty acid salt is to treat the cobalt acetate with the olefin to be converted containing in solution the oleic acid, thereafter adding aqueous caustic, heating and after settling, withdrawing the sodium acetate containing aqueous layer.

A particular advantage of the present invention is the completeness of the cobalt recovery and the facility in handling the recovered cobalt. The latter, in the form of the water soluble salt, may thus be returned directly to reactor 2 via lines 44 and 8; precautions must be taken not to flood the reactor with water. Thus, the amount of water added to reactor 2 should not be substantially above 3 to 5% of the olefin added to the reactor. The tolerance of the mixture in the upper portion of reactor 2 for water is considerably greater than in the lower portion, due to the fact that the aldehyde concentration in the upper part of zone 2 is much greater than in the lower portion. In the embodiment wherein an aqueous solution of cobalt salt is recycled to the aldehyde reactor, it may be desirable to preheat this stream to reaction temperature. It may, however, under some circumstances, be advantageous to add this aqueous stream at a substantially lower temperature level than that obtaining in the reactor, to provide at least a part of the cooling requirements. This would allow the aldehyde recycle cooling stream through 18 to be diminished, thus adding to the overall capacity of the reaction system and cut down the time that aldehydes are exposed to high temperatures.

Still another way of returning catalyst to the reaction zone is to neutralize the aqueous stream and form a solid cobalt material. This is advantageous when it is desired to avoid recycling water, and is somewhat cheaper than reconversion to the high molecular weight fatty acid soap. Thus, the water layer may be neutralized with a suitable base, as NaOH, and the cobalt converted to the hydroxide. The water containing the suspended cobalt hydroxide may be contacted by a small amount of aldehyde product which preferentially wets the solid, causing it to be concentrated in a small volume. The cobalt hydroxide may then be recycled to the aldehyde synthesis stage, or may be used for preparing oil soluble catalyst. Other materials, such as hydrocarbons, water-insoluble alcohols, etc., may also be used as the flotation medium. Likewise, the slurry of cobalt hydroxide may be filtered, and the precipitate suspended as a slurry in aldehyde or olefin feed for recycle to the aldehyde synthesis zone.

The invention admits of numerous modifications apparent to those skilled in the art. Thus, it may be desidable in an existing conventional thermal decobalting type plant to add an auxiliary organic acid washing system to remove the last traces of cobalt generally still found in thermal decobalter effluent. Thus, after a typical thermal decobalting operation, the effluent and feed to the hydrogenation zone, still contained 0.0046% cobalt. After treatment with 0.2% formic acid, the cobalt content was reduced to 0.0003%.

Other modifications obvious to those skilled in the art are within the spirit of the invention.

The invention may be further illustrated by the following specific examples of laboratory and plant tests employing organic acid decobalting.

It may, under some circumstances, be desirable to employ a dilute solution of an inorganic acid for decobalting, such as HCl or $H_2SO_4$. However, it is generally not desirable to recycle the salts thus recovered to the synthesis reactor, because of the possible decomposition products resulting from the subjection of halides and sulfates to aldehyde synthesis conditions of pressure and temperature, particularly in the presence of CO and $H_2$.

EXAMPLE I

A bath decobalting test was made in plant scale equipment by mixing 10 volume percent of a 2.4% strength formic acid with undecobalted Oxo aldehyde containing 950 p. p. m. total cobalt. After mixing, the temperature was gradually raised to 185° F. at atmospheric pressure. Results of the test showed that good decobalting was obtained after 30 minutes at 185° F., when the aldehyde layer, after centrifuging and filtering, contained only 8 p. p. m. soluble cobalt. The water layer at the end of the test contained 9400 p. p. m. total cobalt, and 0.75% free formic acid.

EXAMPLE II

A continuous plant scale decobalting test with formic acid solution was conducted on de-gassed Oxo aldehyde product containing 1140–1570 p. p. m. total cobalt, using 10 vol. percent water and 0.25 vol. percent formic acid on aldehyde. Reaction was carried out in a mixing drum at 175°–185° F., 10 p. s. i. g. pressure, with 2¼ hours hold-up time, followed by settling, removal of the water-formic acid-cobalt layer, then an additional water wash as the aldehyde was pumped to storage tanks. The soluble cobalt content of the aldehyde layer decreased to an average of 98 p. p. m. at the mixing drum outlet, 44 p. p. m. at the settler outlet, 21 p. p. m. after the final water wash, and 2 p. p. m. after settling in the final storage tanks for about 2 days. The water-acid layer as removed from the settler contained 7950 p. p. m. total cobalt.

EXAMPLE III

*Laboratory test data*

REUSE OF COBALT FROM FORMIC ACID SOLUTION

Aldehyde synthesis stage reaction____ Autoclave unit at 3,000 p. s. i. g., 350° F. for 5 hours over 1/1 $H_2$/CO gas.
Feed_____ $C_7$ Olefin.
Catalyst_____ Water solution containing cobalt formate as removed from 100 B./D. plant decobalter.
Water conc. vol. percent on olefin_____ 12.8.
Cobalt, wt. percent on olefin_____ 0.12.
Olefin conversion, percent_____ 80.

Similar data have been obtained on use of cobalt acetate.

The above data clearly show that the recovered aqueous solution of cobalt salt is highly suitable as catalyst for the aldehyde synthesis reaction.

*Laboratory data on use of formic acid after thermal decobalting*

Feed was thermally decobalted aldehyde containing 112 p. p. m. total cobalt, 200° F. treat.

| Vol. Percent $H_2O$ on Aldehyde | Vol. Percent Formic Acid on Aldehyde | Treating Time, Min. | Soluble Cobalt in Product, p. p. m. |
|---|---|---|---|
| 5 | 0.05 | 10 | 5 |
| 10 | 0.003 | 15 | <5 |

Cobalt removal was good, even with small amounts of acid.

*Laboratory data showing time-temperature relationship*

Feed.—Undecobalted aldehyde containing 1660 p. p. m. total cobalt treated with 5 vol. per cent $H_2O$ and 0.25 vol. per cent formic acid on aldehyde.

| Agitation Time, Min. | Temperature, °F. | Soluble Cobalt in Product, p. p. m. |
|---|---|---|
| 10 | 188 | 88 |
| 10 | 170 | 137 |
| 10 | 150 | 175 |
| 30 | 188 | 3 |
| 30 | 170 | 3 |
| 30 | 150 | 20 |

Feed.—Undecobalted aldehyde containing 1800 p. p. m. total cobalt, 100 vol. per cent $H_2O$ and 2 vol. per cent formic acid on aldehyde.

| Agitation Time, Min. | Temperature, °F. | Soluble Cobalt in Product, p. p. m. |
|---|---|---|
| 10 | 188 | 105 |
| 30 | 188 | 4 |
| 60 | 188 | 0 |

*Laboratory data showing use of acetic acid*

Feed.—Undecobalted aldehyde containing approximately 1800 p. p. m. total cobalt.

Treated with 10 vol. per cent $H_2O$ and 1.0 vol. per cent acetic acid on aldehyde.
Treating time—10 minutes at 185° F.
Soluble cobalt in product—4 p. p. m.

*Laboratory data comparing water washing vs. acid washing of thermally decobalted aldehyde product*

Feed.—Aldehyde product from 100 B./D. plant thermally decobalted at 300°–350° F. with hydrogen, containing 75 p. p. m. cobalt.

Washed with water only—65 p. p. m. cobalt.
Washed with formic acid solution—less than 1 p. p. m. cobalt after freezing out emulsion.

That acetic acid gives as effective decobalting as formic acid is shown in the following data, wherein both the aldehyde product taken directly from the carbonylation stage, and the aldehyde product after conventional thermal decobalting, are subjected to acetic acid treatment.

| Sample | Acid | Vol. Percent Acid on Aldehyde | Vol. Percent $H_2O$ on Aldehyde | Temp., °F. of Wash | Time, Min. | Cobalt, p. p. m. |
|---|---|---|---|---|---|---|
| Oxo Prod | Acetic | 0.5 | 50 | 180–190 | 30 | <1 |
| Thermally decobalted Prod. | do | 0.1 | 10 | 180–190 | 30 | <1 |
| Oxo Prod | Formic | 0.25 | 5 | 170 | 30 | 3 |
| Thermally decobalted Prod. | do | 0.036 | 10 | 180–190 | 30 | <1 |

What is claimed is:

1. In a carbonylation process wherein an olefinic compound is contacted in an aldehyde synthesis reaction zone with CO and $H_2$ in the presence of a cobalt catalyst at elevated temperatures and pressures to produce aldehydes, and wherein the resulting crude aldehyde product contaminated with dissolved cobalt compounds is transferred to a decobalting zone, the improvement which comprises adding into said decobalting zone a sufficient amount of a water-soluble organic acid and water to convert said dissolved cobalt compounds to cobalt compounds which are more water-soluble, mixing the added acid in water with said product in the decobalting zone at 150° to 200° F. for a period sufficient to convert said dissolved cobalt compounds and extract them by the water, than stratifying the mixture into an upper aldehyde layer and a lower aqueous layer, the water present being sufficient to remove all but small traces of the cobalt compounds, and separating the lower aqueous layer containing the converted cobalt compounds removed from the aldehyde layer.

2. The process of claim 1 wherein cobalt recovered from said decobalting zone is recycled to said aldehyde synthesis reaction zone.

3. The process of claim 1 wherein an aqueous solution of water-soluble cobalt compounds formed withdrawn from said decobalting zone is recycled to said aldehyde synthesis zone.

4. The process of claim 2 wherein said cobalt salt is converted into a water and oil insoluble form of cobalt, suspended in an organic liquid and recycled to said synthesis zone.

5. The process of claim 4 wherein said liquid is aldehyde product.

6. The process of claim 4 wherein said liquid is olefin feed.

7. The process of claim 2 wherein said aqueous solution of cobalt salt withdrawn from said decobalting zone is contacted at elevated temperature with a solution of a high molecular weight organic acid dissolved in olefin feed, caustic added to said mixture, olefin containing in solution a high molecular weight cobalt salt withdrawn from said mixture, and said olefin and cobalt are recycled to said aldehyde synthesis reaction zone.

8. In a carbonylation process wherein an olefinic compound is contacted in a reaction zone with CO and $H_2$ in the presence of a cobalt carbonylation catalyst under conditions to produce reaction products comprising aldehydes containing the cobalt catalyst dissolved therein and the solution containing the dissolved catalyst is transferred to a catalyst removal zone, the improvement which comprises adding to the said products transferred to the catalyst removal zone a sufficient amount of organic acid and water to convert said dissolved cobalt compounds to cobalt compounds which are more water-soluble, mixing the added acid and water with said reaction product at a temperature in the range of 150° to 200° F. for a period to convert the cobalt compound dissolved in the aldehydes into the more water-soluble cobalt compounds dissolved in the added water, settling the resulting mixture to stratify the mixture into an upper aldehyde layer and a lower water solution layer, thereafter separating the aldehyde layer from the water layer solution containing the more water-soluble cobalt compounds formed.

References Cited in the file of this patent

UNITED STATES PATENTS

| | | |
|---|---|---|
| 2,473,993 | Gresham | June 21, 1949 |
| 2,530,989 | Parker | Nov. 21, 1950 |
| 2,553,364 | Fasce | May 15, 1951 |
| 2,564,130 | Schreyer | Aug. 14, 1951 |
| 2,596,920 | Smith | May 13, 1952 |

FOREIGN PATENTS

| | | |
|---|---|---|
| 493,493 | Belgium | Feb. 15, 1950 |

OTHER REFERENCES

I. G. Farbenindustrie Patent Applications T. O. M. Reel 36, items 21 and part of item 36, application 172,948 IV*d*/120, O. Z. 13,599, Aug. 10, 1942. Deposited in Library of Congress April 18, 1946 (also available in Meyer Translation, pp. 47 to 49).

FIAT Final Report No. 1000, P. B. 81,383, Dec. 26, 1947, pp. 34 and 35.

Wender et al.: Jour. of Am. Chem. Soc., vol. 72, pp. 4375 to 4378, October 1950.